United States

Beckman et al.

[11] 3,884,085
[45] May 20, 1975

[54] ACCELEROMETER ASSEMBLY

[75] Inventors: Paul Beckman, Huntington Valley; Benjamin F. Gerding, Chalfont; Prabhat Kumar Jain, Norristown, all of Pa.

[73] Assignee: Robinson-Halpern Company, Plymouth Meeting, Pa.

[22] Filed: Apr. 5, 1972

[21] Appl. No.: 241,318

[52] U.S. Cl. ............................... 73/517 R; 73/71.2
[51] Int. Cl.² ........................................ G01D 15/12
[58] Field of Search ............. 73/516, 517, 70.2, 71, 73/71.2, 71.4, 88.5 R, 141 A, 497; 338/2, 5, 338/3

[56] References Cited
UNITED STATES PATENTS
2,487,793  11/1949  Esval et al. .................... 73/517 R X
FOREIGN PATENTS OR APPLICATIONS
763,226  12/1956  United Kingdom ............... 73/517 B

*Primary Examiner*—James J. Gill
*Attorney, Agent, or Firm*—Paul Maleson; Morton J. Rosenberg

[57] ABSTRACT

An accelerometer assembly for determining acceleration forces in a predetermined direction and which is adapted for use in a high temperature environment. The assembly includes a ceramic beam positioned internal to a hermetically sealed chamber. The ceramic beam is cantilever mounted on one end and is partially insertable within an elastic stop assembly at an opposing end. A predetermined weight is rigidly secured to the beam to act as a strain amplifier. Acceleration forces cause displacement of the weight and ceramic beam unit which in turn provides known strain in the ceramic beam. Strain gauges bonded to the ceramic beam are connected to an externally located Wheatstone Bridge which provides a read out of the acceleration forces experienced by the accelerometer assembly.

22 Claims, 6 Drawing Figures

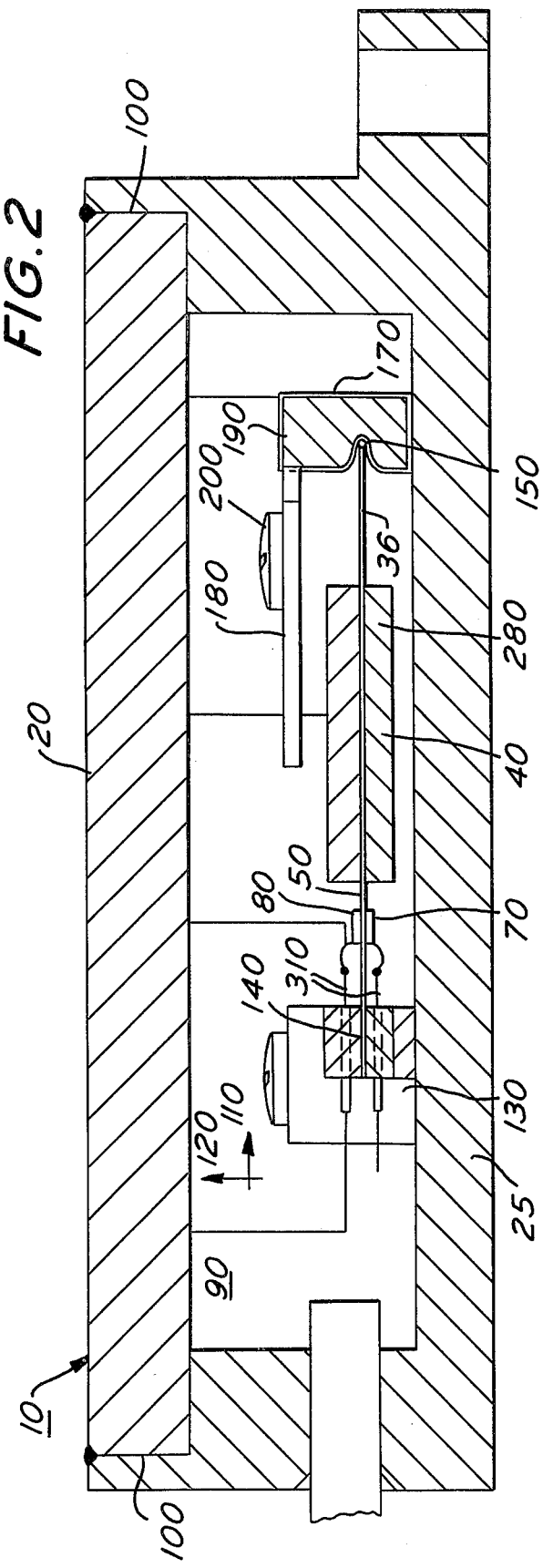
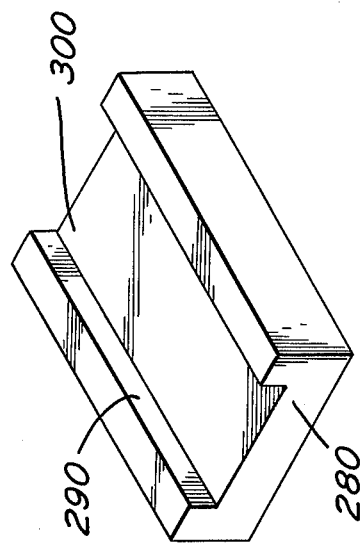

ACCELEROMETER ASSEMBLY

BACKGROUND OF THE INVENTION

1. Field of the Invention

This invention relates to the field of measuring acceleration forces. In particular, this invention pertains to the field of accelerometers. More in particular, this invention relates to the field of using ceramic beam members and compatible high temperature components within an accelerometer to produce an assembly which is operable within a high temperature environment.

2. Prior Art

Accelerometer assemblies are well known in the prior art. However, such prior devices are not applicable to operation in corrosive and high temperature environments. Some prior accelerometers include cantilever beam mounting as an acceleration force measurement and determination system. However, such devices include beam materials which degrade as a function of temperature and are not operational in temperature ranges exceeding 500°F.

Additionally, cantilever mounted beam accelerometers which employ impact damping mechanisms are knwon in the art. However, such devices do not provide sufficient cushioning effect for an oscillating beam over a wide acceleration force range when the accelerometer is subjected to a high temperature environment.

SUMMARY OF THE INVENTION

An object of the present invention is to provide an accelerometer assembly capable of measuring acceleration forces when subjected to a high temperature environment.

A further object of the present invention is to provide an accelerometer capable of measuring acceleration forces over a wide acceleration load range.

A still further object of the instant invention is to provide a reliable, low cost, easily manufacturable accelerometer assembly.

An accelerometer assembly for measuring acceleration forces in a predetermined direction which is adapted for use in a high temperature environment. The assembly includes a housing which defines an internal chamber. A longitudinally extended ceramic beam is contained within the chamber and is movable in the predetermined direction responsive to the acceleration forces applied to the housing. Holding mechanisms partially constrain the ceramic beam on opposing longitudinal ends. Acceleration measurement mechanisms are rigidly secured to the ceramic beam for measuring the assembly acceleration when the beam is moveably actuated in the predetermined direction.

BRIEF DESCRIPTION OF THE DRAWINGS

FIG. 2 is a sectional view of the accelerometer taken along the secton line 2—2 of FIG. 1;

FIG. 5 is a rear view of the beam stop assembly showing the mounting apparatus of the cushion subassembly to the frame of the beam stop assembly; and, FIG. 6 is a perspective view of the lower weight member including a channel for insertion of the beam.

DESCRIPTION OF THE PREFERRED EMBODIMENT

Figure 1:
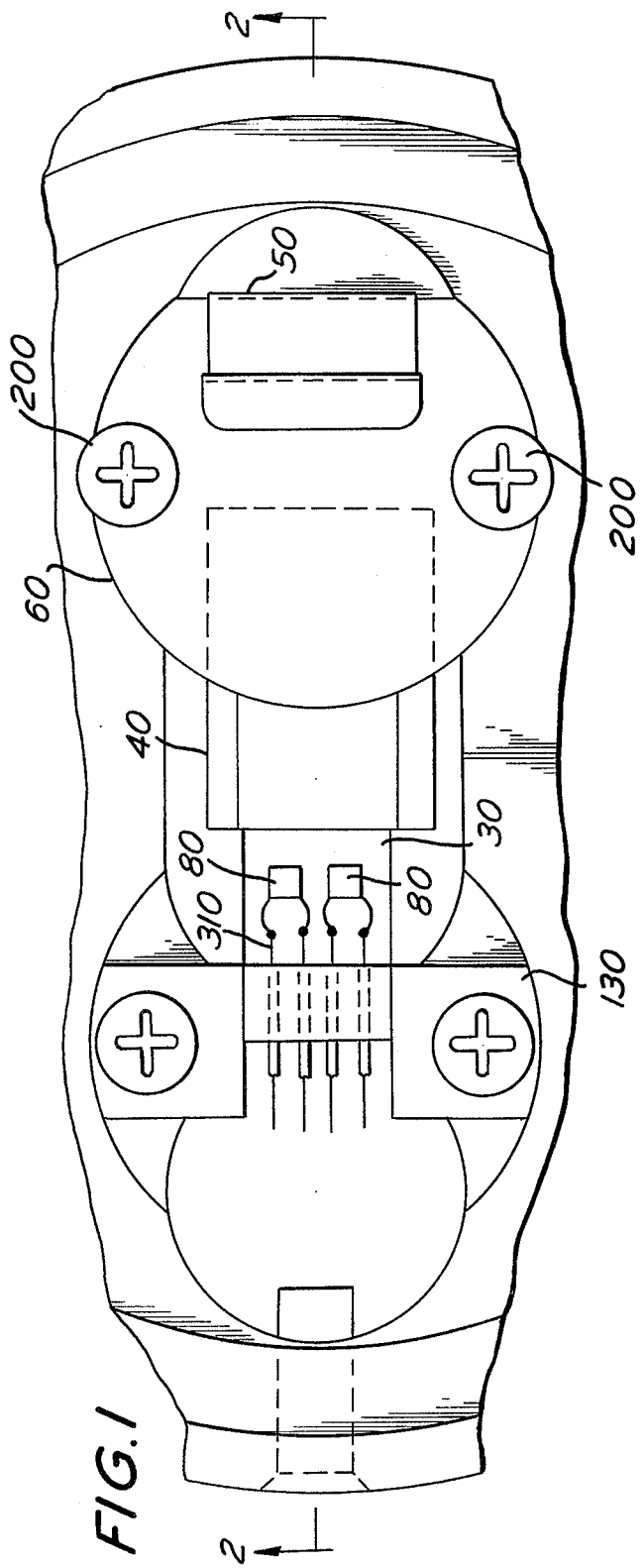
FIG. 1 is a top view of the accelerometer assembly showing the basic subassemblies within the housing chamber.

Referring now to FIGS. 1 and 2, there is shown accelerometer 10 for measuring the acceleration of system 10 relative to a surrounding environment. Accelerometer assembly 10, as geometrically seen in the cross-sectional representative of FIG. 2 is responsive to relative motion having a resultant force component normal to the longitudinal extension plane of beam 30. System 10 as will be described in following paragraphs is particularly suited to the measurement of acceleration forces when the assembly is surrounded by a high temperature environment. Operation of accelerometer 10 as shown, is based upon the inertial principle in that seismic mass or weight 40 is fixedly secured to beam 30 which is flexuraly displaced when assembly 10 is subjected to either linear or vibratory acceleration. Due to the basic inertia characteristics of mass 40, the motion of the mass is opposed to the instantaneous translation of assembly 10. Weight 40 causes deflection of beam 30 and opposing bending moments are produced respectively on the upper beam surface 50 and the lower beam surface. The bending moments cause tensile and compressive stresses within beam 30 which may be translated to strains having maximum values at the upper and lower surfaces. The strains produced by the moving beam 30 are sensed by two sets of strain gauges 70 and 80 fixedly secured to lower and upper beam surfaces 60 and 50 respectively. When bending occurs in beam 30, the strain is translated to gauges 70, 80 which produce a signal proportional to the acceleration of assembly 10. Gauges 70 and 80 are connected in a standard Wheatstone Bridge (not shown) to monitor the signal produced in the standard manner.

The basic components of assembly 10 contained within chamber 90 includes strain collecting member or cantilever beam 30. Member 30 is the primary structure which senses the strain when accelerometer 10 is subjected to acceleration. Seismic mass or weight 40 secured to beam 30, causes system 10 to respond to acceleration forces and may be considered to be an acceleration force amplifier. When accelerometer 10 is positioned contiguous with a structure or within a moving environment, system 10 is displaced in response to the moving interface. Mass 40, however, is not constrained to move with housing members 20, 25 and is therefore free to move in accordance with its inertial characteristics. Weight 40, therefore becomes an amplifier for the strain produced in beam 30 and transmitted to strain gauges 70, 80.

Stop assembly 170 secured to housing 25 holds beam end 150 in releasable securement or partial constraint in order to restrict the transverse displacement of member 30. This restraint is made necessary since unlimited movement of beam 30 may result in fracture under high acceleration loads. Strain gauges 70, 80 are mounted in secured contact with beam 30 in order to relay the strain signal manifested by the movement of weight 40 acting on member 30. Mounting device 130 is secured to beam 30 and lower housing 25 and adapted to securely hold member 30 in cantilever restraint.

As shown in FIG. 2, assembly 10 includes upper housing 20 and lower housing 25 mated to each other to form active chamber 90 where system 10 components are mounted. Outer casings or housings 20, 25 are manufactured from stainless steel or like materials in order to minimize corrosive effects of an external environment relating to both thermal and chemical degradation which may be encountered. Housings 20, 25 are mounted to each other along interface boundary 100 through bolting, welding or some like technique in order to hermetically seal the contents of active chamber 90 from a potentially corrosive environment into which system 10 may be immersed.

Figure 3:
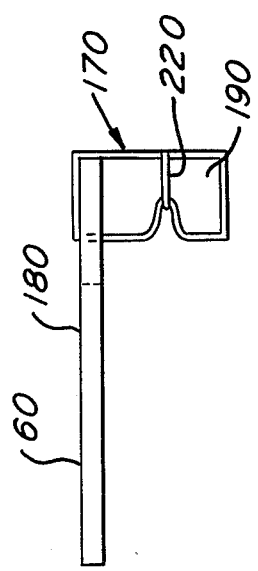
FIG. 3 is a frontal view of the beam stop assembly.

Strain collecting member or beam 30 extends in longitudinal direction 110 within assembly chamber 90 as is shown. As has been described, elastic displacement of member 30 in transverse direction 120 causes a signal to be transferred through strain gauges 70, 80 representing the acceleration of system 10. Beam 30 is substantially planar in construction and passes substantially parallel to upper and lower housing surfaces 20, 25 when a state of equilibrium or zero relative motion exists between assembly 10 and the surrounding environment. Member 30 is rigidly secured to mounting device 130 at a first end 140. In turn mounting assembly 130 is securely fastened to lower housing 25 in order to achieve a cantilever extension of beam 30. Beam second end 150, longitudinally opposing first end surface 140, is releasably mounted within recess 160 of stop assembly or damping mechanism 170 shown in FIGS. 3, 4, and 5. In this manner stop assembly 170 provides limited motion of beam 30 in both transverse and longitudinal directions 120, 110 when beam 30 is set into a vibratory motion. Such a mounting provides a releasable restraint for member 30 and surface 150 when assembly 10 is in operation. The section of beam 30 between the weight 40 and the stop assembly 170 is designated 36.

In order to maintain useful elastic properties in temperature ranges approximating 1000°F beam 30 is constructed of a ceramic material such as beryllium oxide, thorium oxide, aluminun oxide, or some like material. In general, beam 30 is formed having a monocrystalline structure amenable to both structural and thermal stresses that may be encountered within the surrounding environment. This structure permits the use of beam 30 over a wide range of temperature environments wherein the strain and stress readings obtained from acceleration forces remain substantially constant or where the signals produced may be biased for different temperature surroundings.

Stop assembly 170 comprises stop disc 180 and stop cushion member frame 190. Stop disc 180 is rigidly secured through integral construction to cushion subassembly frame 190 and substantially contoured in the form of a truncated disc as is shown in FIG. 1. Disc 180 is rigidly mounted to lower housing 25 through bolt members 200 or some like means of securement not important to the inventive concept. In this manner, disc 180 becomes a platform upon which assembly 170 may be mounted to housing 25 in a secured fashion. Beam second end 150 is insertable within recess 160 of cushion 190 which is provided to insure a resilient surface upon which member 30 may act when overextended motion is produced in transverse direction 120. The basic frame of stop disc 180 and cushion 190 are constructed of stainless steel or like material capable of accepting large temperature excursions. Since assembly 170 is mounted to housing members 20, 25 it is preferred that stop assembly 170 be constructed of the same materials in order that the temperature coefficient of expansions be substantially equal.

Figure 4:
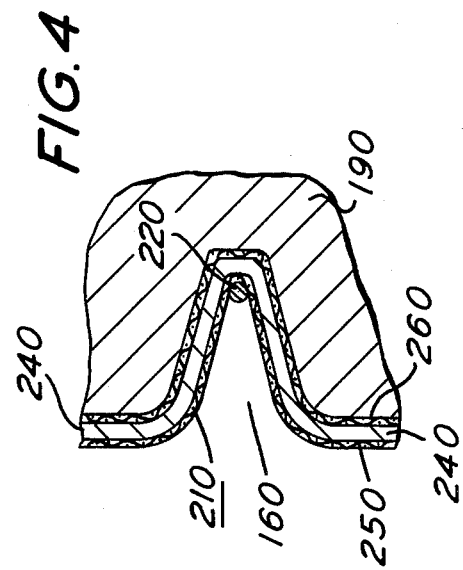
FIG. 4 is a sectional view of the cushion subassembly mounted to the base frame of the beam stop assembly.

To provide the necessary flexible restraint for beam 30 within recess 160, flexible cushion assembly 210 is mounted to the cushion frame 190. As shown in FIG. 4, cushion assembly 210 comprises three layers of material mounted to the beam receiving surface of stop cushion frame 190. The mount 220 is a wire restraint passing around the periphery of frame 190. Wire restraint 220 passes within recess 160 at the apex thereof and securely holds the layered flexible material to the front face of cushion frame 190. Restraint 220, as is shown in FIG. 5 is secured to the back face 230 of frame 190. The securement may be through brazing, weld or some like technique used in order to maintain the layered cushion in fixed constraint to frame 190. Restraint wire 220 is constructed of 10 mil nickel wire or some like material capable of withstanding wide temperature excursions.

Flexible cushion asssembly 210 is constructed in a three layer assembly as is shown in FIG. 4. Cushion cloth 240 is contained within inner and outer screen layers 250 and 260 comprising a pair of stainless steel one mil wire meshed cloth layers having a size approximating 400 mesh. Layers 250 and 260 hold cushion cloth 240 in fixed restraint with respect to frame 190. Cloth or fabric 240 is composed of zirconium oxide commonly referred to as zircar cloth approximating 0.030 inches in thickness and is a high temperature material which maintains flexible characteristics up to 2000°F.

Recess 160 is tapered at an angle approximating 2.5° from a maximum opening size to a minimum opening area in the region of the apex of recess 160 as is shown in FIG. 4. The taper permits adjustment of beam 30 within recess 160 and provides tolerance criteria when the beam is subjected to transverse motion.

Referring now to FIG. 2, there is shown seismic weight or mass 40 rigidly secured to ceramic beam 30. Weight 40 is an assembly comprising upper weight block 270 and lower weight member 280 (shown in FIG. 6) bonded together in order to form a unitary weight member 40 for attachment to beam 30 at a predetermined point or station in the longitudinal extension of member 30. Both members 270 and 280 are constructed of Kennertium W2 alloy which is commercially available from Kennametal Inc. and is a tungsten alloy consisting of 97.6% tungsten, 2.4% nickel and traces of copper. This particular alloy presents a high density metal applicable to high temperature environments. In general, weight 40 may be composed of platinum, lead, or some like material having a high density applicable to the extended temperature ranges which may be found in the surrounding environment. The tungsten alloy used in the preferred embodiment includes a relatively low temperature coefficient of expansion in the range of $2.5 \times 10^{-6}$ ft/°F. This low coefficient of expansion is useful since weight 40 is mounted on beam 30 which in itself has a low coefficient of expansion in the range of $4.5 \times 10^{-6}$ ft/°F. This compatability provides acceptable stress concentrations between the mated members at extended temperature excursions.

As shown in FIG. 6, lower weight block 280 includes channel 290 passing in the longitudinal direction 110. Channel 290 is formed having a width equal to that of beam member 30 in order to permit interface mating throughout the length. Upper weight block 270 is a slab having overall length and width dimensions equal to lower block 280. In assembly, beam 30 is coated with a commercial ceramic bonding cement such as PBX Cement manufactured by Teleflex Inc. Lower weight 280 is placed into beam 30 in contact along channel 290. The lower face of weight 270 is coated with the cement bond and placed in contact with lower weight member 280. Sidewalls 300 of weight 280 have a height in excess of beam 30 approximating 0.020 inches. This dimensional arrangement provides a small tolerance between beam 30 and upper weight 270 along the channel 290 longitudinal length. The assembly consisting of weight 40, now attached to beam 30 with the bonding cement is cured in an oven set to approximately 600°F for a period within the range of 1-5 hours. As a final step, weight or seismic mass 40 is brazed to beam 30 utilizing silver solder or some like material. In this manner, weight 40 and beam 30 become a unitary assembly for insertion into active chamber 90 of accelerometer assembly 10.

Strain gauges 70 and 80 are placed in contact with beam 30 at a point somewhat adjacent mounting device 130 as is shown in FIG. 2. Gauges 70 and 80 are preferably high temerature, free grid gauges. Since beam 30 is a ceramic, the conductive properties are negligible and gauges 70 and 80 may therefore be placed in direct contact with upper and lower beam surfaces 50 and 60. The gauges 70, 80 are wire type where particular wires are looped or otherwise positionally placed to achieve a particular resistance. In the present accelerometer assemblies 10, the resistance used is approximately 120 ohms; however, such is not important to the inventive concept as herein stated. The wire making up the free grid strain gauges 70, 80 is approximately 0.3 mil in diameter and may be composed of a tungsten platinum alloy commonly available in the commercial market.

Of critical importance, is the fact that gauges 70, 80 be continuously contiguous with upper and lower surfaces 50, 60 of strain collecting member 30. Where contiguous contact is not maintained, there will not be a complete transference of strain from beam 30 to gauges 70, 80. Gauges 70, 80 are bonded to beam surfaces 50, 60 preferably utilizing a ceramic cement base using a phosphate binder. This bonding material is commonly referred to as "PBX Cement" and is commercially available from Teleflex Inc. This bonding of gauges 70, 80 to beam 30 provides an operating range up to approximately 1000°F. and allows continuous read out capability when accelerometer 10 is placed in a high temperature environment.

In general, two gauges 70 are placed on lower surface 60 and similarly two gauges 80 are placed on upper surface 50. The use of a pair of gauges placed at each location is dictated by the external hookup to an externally located Wheatstone Bridge (not shown). The Bridge unit has four arms, and in using four gauges, each of the arms may be loaded to achieve the maximum output from the external unit. Leads 310 are attached to gauges 70, 80 by a welding operation or some like technique and are preferably 3 mil platinum wire leads. Leads 310 are passed into holder or mounting device 130 and proper connection is made to the external Bridge circuit.

Strain gauges 70, and 80 are mounted on beam 30 in such a way that there is a continuously contacting interface. Beam 30 is substantially electrically non- conducting and therefore a bonded type strain gauge mount will not effect acceleration force reading accuracy.

In the scope of the work undertaken in the field of accelerometers, the invention as has been detailed herein, provides a high temperature operable system for measurement of acceleration forces. A number of modifications and variations of the present invention as hereinbefore set forth may be made without departing from the spirit and skill thereof, and therefore only such limitations should be imposed as are indicated by the appended claims.

What is claimed is:

1. An accelerometer assembly for measuring acceleration forces in a predetermined direction adapted for use in a high temperature environment, comprising:
   a. a housing defining an internal chamber;
   b. a longitudinally extended ceramic beam within said chamber, said beam rigidly secured at one longitudinal end thereof to said chamber and partially constrained on the opposing longitudinal end thereof, said beam being movable in said predetermined direction responsive to said acceleration forces applied to said housing;
   c. means for respectively rigidly securing and partially constraining said ceramic beam on opposing longitudinal ends thereof within said internal chamber of said housing, said securing means including:
      1. Cantilever restraining means rigidly secured to a first end of said longitudinally extended ceramic beam, said cantilever restraining means including a frame member fastened to an internal wall of said housing, said ceramic beam being rigidly fastened to said frame member on said first end for maintaining said longitudinally extended beam in spaced relation to said internal wall to said housing; and,
      2. Stop means for movably interfacing with a second end of said ceramic beam, said second end of said beam being longitudinally opposed to said beam first end, said stop means including a base frame member rigidly secured to an internal wall of said housing adjacent said second end of said beam, said base frame member having a recess formed within a wall facing said beam second end for insertion of said ceramic beam second end in said longitudinally extended direction, said stop means including a flexible cushion assembly secured to and contiguous with said wall for resiliently contacting said ceramic beam when said ceramic beam moves in said predetermined direction; and
   d. Elastic displacement measurement means rigidly secured to said ceramic beam for measuring said beam elastic displacement when said beam is movably actuated in said predetermined direction.

2. The accelerometer assembly as recited in claim 1 wherein said cushin assembly includes:
   a. a first screen mesh contiguous said forward wall of said base frame;
   b. a high temperature fabric interfacing with said first screen mesh on a first face of said fabric; and,
   c. a second screen mesh interfacing with said high temperature fabric on a second face thereof, said second face of said fabric opposing said first face.

3. The accelerometer assembly as recited in claim 2 wherein said high temperature fabric is composed of zirconium oxide.

4. The accelerometer assembly as recited in claim 3 wherein said screen mesh is composed of stainless steel, said mesh having a size approximating 400.

5. The accelerometer assembly as recited in claim 1 wherein said recess formed within said forward wall includes sidewalls having a longitudinal taper, said recess having a maximum cross-sectional area at a most forward portion of said forward wall.

6. The accelerometer assembly as recited in claim 5 wherein said longitudinal taper of said recess sidewalls forms an angle approximating 2.5° with respect to said longitudinal direction.

7. The accelerometer assembly as recited in claim 1 wherein said longitudinally extended ceramic beam includes means for amplifying bending moment stresses in said beam when said beam is movably actuated in said predetermined direction.

8. The accelerometer assembly as recited in claim 7 wherein said stress amplifying means includes a weight, said weight rigidly secured to said ceramic beam at a predetermined location in said longitudinal direction.

9. The accelerometer assembly as recited in claim 8 wherein said weight has a mass substantially greater then the mass of said ceramic beam and said predetermined location of said weight is between said first and second ends of said beam and at least far enough from said second end so that said weight does not contact said stop means.

10. The accelerometer assembly as recited in claim 9 wherein said weight is composed of a tungsten alloy.

11. The accelerometer assembly as recited in claim 1 wherein said ceramic beam is composed of a monocrystalline structure.

12. The accelerometer assembly as recited in claim 1 wherein said acceleration measurement means includes a plurality of strain gauges bonded to said ceramic beam, said strain gauges electrically connected to an external device for measuring strains produced in said gauges by said movement of said beam.

13. The accelerometer assembly as recited in claim 12 wherein said acceleration measurement means includes a first pair of strain gauges bonded to an upper surface of said ceramic beam and a second pair of strain gauges bonded to a lower surface of said ceramic beam.

14. The accelerometer assembly as recited in claim 13 wherein said strain gauges are composed of platinum wire.

15. The accelerator assembly as recited in claim 14 wherein said strain gauge wires are bonded to said ceramic beam by a ceramic base bonding cement, said strain gauge wires for contacting said beam continuously throughout a predetermined portion of said strain gauge wires.

16. The accelerometer assembly as recited in claim 1 wherein said housing hermetically seals said internal chamber from said high temperature environment.

17. The accelerometer assembly as recited in claim 16 wherein said housing is constructed of stainless steel.

18. A high temperature accelerometer assembly for use in environments having extensive temperature excursions, comprising:
   a. a hollow housing defining a hermetically sealed internal chamber;
   b. a monocrystalline ceramic beam member longitudinally extended within said internal chamber, said beam member being cantilever mounted on a first end thereof to a frame secured to an inner wall of said chamber;
   c. a weight secured to said beam at a predetermined point in said longitudinal extension of said beam;
   d. means for flexibly partially constraining a second end of said beam, said second end of said beam longitudinally opposing said first end of said beam; and,
   e. a plurality of strain gauges bonded to said ceramic beam for measuring the strain in said beam when said beam is displaced in a predetermined direction.

19. The high temperature accelerometer assembly as recited in claim 18 wherein said flexible constraining means includes a base frame rigidly secured to said housing said base frame having a tapered recess diverging away from said inner wall and toward said beam formed within the inner wall facing said second end of said beam for partial insertion of said monocrystalline ceramic beam.

20. The high temperature accelerometer assembly s recited in claim 19 wherein said flexible constraining means includes resilient beam impact means contiguous with said forward wall and said tapered recess formed therein and securely fastened to said base frame, said ceramic beam for contacting said flexible constraining means when said ceramic beam is displaced in said predetermined direction.

21. The high temperature accelerometer assembly as recited in claim 20 wherein said flexible constraining means includes a high temperature cloth positionally fixed between opposing layers of screen mesh.

22. An accelerometer assembly for measuring acceleration forces in a predetermined direction adapted for use in a high temperature environment, comprising:
   a. a housing defining an internal chamber;
   b. a longitudinally extended monocrystalline ceramic beam within said chamber, said beam rigidly secured at one longitudinal end thereof to said chamber and partially constrained on the opposing longitudinal end thereof, said beam being moveable in said predetermined direction responsive to said acceleration forces applied to said housing;
   c. means for respectively rigidly securing and partially constraining said monocrystalline ceramic beam on opposing longitudinal ends thereof within said internal chamber of said housing; and,
   d. elastic displacement measurement means rigidly secured to said monocrystalline ceramic beam for measuring said beam elastic displacement when said beam is moveably actuated in said predetermined direction.

* * * * *